(12) United States Patent
Mazany et al.

(10) Patent No.: US 7,968,192 B2
(45) Date of Patent: Jun. 28, 2011

(54) OXIDATION INHIBITION OF CARBON-CARBON COMPOSITES

(75) Inventors: Anthony M. Mazany, Amelia Island, FL (US); Robert Bianco, Strongsville, OH (US); Edward R. Stover, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 93 days.

(21) Appl. No.: 12/619,126

(22) Filed: Nov. 16, 2009

(65) Prior Publication Data

US 2010/0055466 A1    Mar. 4, 2010

(51) Int. Cl.
*B32B 9/00* (2006.01)
(52) U.S. Cl. .................. 428/408; 427/248.1; 106/14.05; 106/14.12; 106/14.44; 188/251 R
(58) Field of Classification Search .................. None
See application file for complete search history.

(56) References Cited

U.S. PATENT DOCUMENTS

| | | | |
|---|---|---|---|
| 2,685,539 A | 8/1954 | Woodburn et al. |
| 2,685,540 A | 8/1954 | Woodburn, Jr. et al. |
| 2,685,541 A | 8/1954 | Woodburn, Jr. et al. |
| 2,685,542 A | 8/1954 | Woodburn, Jr. et al. |
| 2,989,153 A | 6/1961 | Boulet |
| 3,342,627 A | 9/1967 | Paxton et al. |
| 3,510,347 A | 5/1970 | Strater |
| 3,692,150 A | 9/1972 | Ruppe, Jr. |
| 3,713,882 A | 1/1973 | DeBrunner et al. |
| 3,794,509 A | 2/1974 | Trauger et al. |
| 3,972,395 A | 8/1976 | Jannasch et al. |
| 4,290,510 A | 9/1981 | Warren |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,548,957 A | 10/1985 | Hucke |
| 4,617,232 A | 10/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,837,073 A | 6/1989 | McAllister et al. |
| 4,863,001 A | 9/1989 | Edmisten |

(Continued)

FOREIGN PATENT DOCUMENTS

CN    1046517    10/1990

(Continued)

OTHER PUBLICATIONS

Non-Final Office Action for U.S. Appl. No. 12/619,061 dated Feb. 4, 2011.

(Continued)

*Primary Examiner* — David Turocy
(74) *Attorney, Agent, or Firm* — Snell & Wilmer L.L.P.

(57) ABSTRACT

A method of inhibiting oxidation of a porous carbon-carbon composite is disclosed and comprises the steps of: (a) contacting the carbon-carbon composite with an oxidation inhibiting composition comprising phosphoric acid or an acid phosphate salt, at least one aluminum salt, and at least one additional metal salt, the oxidation inhibiting composition penetrating at least some of the pores of the carbon-carbon composite; and (b) heating the carbon-carbon composite at a temperature sufficient to form a deposit from the oxidation inhibiting composition within at least some of the penetrated pores of the carbon-carbon composite. The foregoing oxidation inhibiting composition and carbon-carbon composites treated by the foregoing method are also disclosed.

20 Claims, 1 Drawing Sheet

U.S. PATENT DOCUMENTS

| | | | |
|---|---|---|---|
| 4,958,998 A | 9/1990 | Yamauchi et al. |
| 5,073,454 A | 12/1991 | Graham |
| 5,077,130 A | 12/1991 | Okuyama et al. |
| 5,102,698 A | 4/1992 | Cavalier et al. |
| 5,198,152 A | 3/1993 | Liimatta et al. |
| 5,215,563 A | 6/1993 | LaCourse et al. |
| 5,224,572 A | 7/1993 | Smolen, Jr. et al. |
| 5,242,746 A | 9/1993 | Bommier et al. |
| 5,273,819 A | 12/1993 | Jex |
| 5,298,311 A | 3/1994 | Bentson et al. |
| 5,401,440 A | 3/1995 | Stover et al. |
| 5,439,080 A | 8/1995 | Haneda et al. |
| 5,501,306 A | 3/1996 | Martino |
| 5,518,683 A | 5/1996 | Taylor et al. |
| 5,622,751 A | 4/1997 | Theabault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geringer |
| 5,971,113 A | 10/1999 | Kesavan et al. |
| 5,981,072 A | 11/1999 | Mercuri et al. |
| 6,016,450 A | 1/2000 | Crock |
| 6,071,603 A | 6/2000 | Sakai et al. |
| 6,346,331 B2 | 2/2002 | Harvey et al. |
| 6,460,374 B2 | 10/2002 | Sakai et al. |
| 6,497,307 B1 | 12/2002 | Schoo et al. |
| 6,551,701 B1 | 4/2003 | Nohr et al. |
| 6,551,709 B1 | 4/2003 | Stover |
| 6,555,173 B1 | 4/2003 | Forsythe et al. |
| 6,668,984 B2 | 12/2003 | Gray |
| 6,884,467 B2 | 4/2005 | Walker et al. |
| 6,969,422 B2 | 11/2005 | Mazany et al. |
| 2002/0058576 A1 | 5/2002 | Mazany et al. |
| 2003/0143436 A1 | 7/2003 | Forsythe et al. |
| 2004/0038032 A1 | 2/2004 | Walker et al. |
| 2004/0213906 A1 | 10/2004 | Mazany et al. |
| 2005/0022698 A1 | 2/2005 | Mazany et al. |

FOREIGN PATENT DOCUMENTS

| | | |
|---|---|---|
| EP | 0677499 | 10/1995 |
| EP | 677499 | 10/1995 |

OTHER PUBLICATIONS

USPTO; Office Action dated Feb. 22, 2011 in U.S. Appl. No. 12/829,178.
USPTO; Office Action dated Apr. 1, 2010 in U.S. Appl. No. 11/315,592.
EP; Office Action dated Oct. 28, 2008 in Application No. 06 837 063.4-2111.
USPTO; Advisory Action dated Feb. 25, 2010 in U.S. Appl. No. 11/315,592.
USPTO; Final Office Action dated Dec. 11, 2009 in U.S. Appl. No. 11/315,592.
USPTO; Office Action dated Jun. 9, 2009 in U.S. Appl. No. 11/315,592.
USPTO; Office Action Restriction dated Feb. 5, 2009 in U.S. Appl. No. 11/315,592.
USPTO; Notice of Allowance dated Oct. 1, 2009 in U.S. Appl. No. 10/829,144.
USPTO; Office Action dated May 29, 2009 in U.S. Appl. No. 10/829,144.
USPTO; Final Office Action dated Jan. 29, 2009 in U.S. Appl. No. 10/829,144.
USPTO; Office Action dated Oct. 24, 2008 in U.S. Appl. No. 10/829,144.
USPTO; Final Office Action dated Jul. 16, 2008 in U.S. Appl. No. 10/829,144.
USPTO; Office Action dated Feb. 26, 2008 in U.S. Appl. No. 10/829,144.
EP; Office Action dated Jan. 4, 2008 in Application No. 04 816 727.4-2111.
Rovner; "A Haven for Glass, Ceramics;" Science & Technology; May 24, 2004; pp. 33-39.
Air Products; Complete Product Offering Brochure; www.airproducts.com.
McKee, D.W.; Chemistry and Physics of Carbon, vol. 16, P.L. Walker and P.A. Thrower eds., Marcel Dekker, 1981, p. 30-42.
PCT; International Preliminary Report on Patentability dated Aug. 18, 2005 in Application No. PCT/US2004/012222.
PCT; International Search Report dated Apr. 28, 2005 in Application No. PCT/US2004/012222.
PCT; International Search Report Jul. 3, 2007 in Application No. PCT/US2006/043343.
USPTO; Office Action dated Feb. 4, 2011 in U.S. Appl. No. 12/619,061.
PCT; Written Opinion dated Oct. 22, 2005 in Application No. PCT/US2004/012222.
PCT; International Preliminary Report on Patentability dated Jul. 13, 2008 in Application No. PCT/US2006/043343.
PCT; Written Opinion dated Jun. 22, 2008 in Application No. PCT/US2006/043343.
EP; Office Action dated Feb. 4, 2010 in Application No. 06 837 063.4-2111
EP; Office Action dated Feb. 9, 2009 in Application No. 06 837 063.4-2111

OXIDATION INHIBITION OF CARBON-CARBON COMPOSITES

CROSS-REFERENCE TO RELATED APPLICATIONS

This application claims priority to U.S. application Ser. No. 10/829,144, entitled "OXIDATION INHIBITION OF CARBON-CARBON COMPOSITES" and filed Apr. 21, 2004 now U.S. Pat. No. 7,641,941. The '144 application claims priority to U.S. Provisional Patent Application Ser. No. 60/464,619 filed Apr. 22, 2003. Both the '144 application and the '619 provisional application are hereby incorporated by reference in their entirety.

TECHNICAL FIELD

The invention relates to a method of inhibiting the oxidation of a porous carbon-carbon composite. The invention relates to an oxidation inhibiting composition, and to carbon-carbon composites treated by the method.

BACKGROUND

Many aircraft braking systems incorporate carbon-carbon composite discs. The brakes can absorb large amounts of kinetic energy required to stop the aircraft during a landing. During some of the stops, the carbon may be heated to sufficiently high temperatures that may oxidize the surfaces exposed to air. Carbon composites with the thermal and mechanical properties required for specific brake designs have been prepared. However, these composites may have residual open porosities of about 5% to 10%. The open pores allow air, moisture and contaminates to infiltrate into the carbon-carbon composite. At the elevated temperatures reached during use, the infiltrate materials may cause or enhance internal oxidation of the carbon-carbon composite. The internal oxidation may weaken the carbon-carbon composite, especially in and around the brake rotor lugs or stator slots. These areas transmit the torque during braking. One simple, low-cost method of minimizing loss of strength and structural integrity is the application of phosphoric acid to non-wear surfaces of brake discs, followed by baking to 650° C. This method inhibits oxidation of carbon sufficiently for many applications, including aircraft brakes.

Similarly, carbon-carbon composites have been coated with barriers to include silicon-based coatings, such as silicon carbide. The barriers may reduce the inflow of air, and thereby inhibit oxidation of the carbon-carbon composites. Unfortunately, the barriers may crack too easily, and may have an undesirable inherent porosity. These cracks and pores allow air to infiltrate the carbon-carbon composite despite the presence of the barrier.

Some commercial transport brakes have suffered crushing in the lugs or stator slots. The damage has been associated generally with oxidation of the carbon-carbon composite at elevated temperatures. A specific association is damage caused by the oxidation enlargement of cracks around fibers, or enlargement of cracks in a barrier coating applied to the carbon-carbon composite. The enlargement effect may occur at depths of up to about 12.5 millimeters (mm) (0.5 inch) beneath exposed surfaces.

Elements identified in severely oxidized regions include potassium (K) and sodium (Na). Alkali elements are believed to catalyze carbon oxidation and such oxidation catalysts are generally present as contaminants. These contaminating materials may come into contact with a carbon-carbon composite, such as an aircraft brake, during cleaning and/or de-icing procedures used on aircraft. Such procedures can use cleaning or de-icing materials that include alkali metals (such as sodium and potassium). Other sources of sodium include salt deposits left from seawater or sea spray. These contaminating materials may penetrate into the pores of the carbon-carbon composite aircraft brakes, leaving catalytic deposits within the pores. When such contamination occurs, the rate of carbon loss by oxidation can be increased by one to two orders of magnitude. It may be desirable to provide protection against such catalyzed oxidation.

McKee points out that phosphates can deactivate catalytic impurities in carbon by converting them to inactive, stable phosphates (D. W. McKee, *Chemistry and Physics of Carbon* 16, P. L. Walker and P. A. Thrower eds., Marcel Dekker, 1981, p. 30). Woodburn and Lynch (U.S. Pat. No. 2,685,539) describe ways of impregnating pores in carbon or graphite with aluminum phosphate. Woodburn and Lynch disclose suitable compositions having a molar ratio of $Al_2O_3:P_2O_5$ in a range of from about 0.2:1 to about 0.8:1.

Other oxidation inhibition methods previously used are disclosed in: U.S. Pat. No. 4,439,491, issued to Wilson, which relates to carbon protected against oxidation by application of an aqueous solution comprising mono-ammonium phosphate, zinc orthophosphate, phosphoric acid, boric acid, cupric oxide, and wetting agent; U.S. Pat. No. 4,837,073, issued to McAllister et al, which relates to a barrier coating and penetrant providing oxidation protection for carbon-carbon materials; U.S. Pat. No. 5,401,440, issued to Stover et al, which relates to a composition for inhibiting catalyzed oxidation of carbon-carbon composites that includes an oxidation inhibiting composition comprising phosphorus acid, a metal phosphate, and a compatible wetting agent; and, U.S. Pat. No. 5,759,622, issued to Stover, which relates to a composition for inhibiting catalyzed oxidation of carbon-carbon composites that includes an oxidation inhibiting composition comprising phosphoric acid, a metal phosphate or combination of a zinc salt and an aluminum salt, and a compatible wetting agent. The carbon-carbon composite in Stover may have a barrier coating.

More recent patents, including U.S. Pat. No. 5,714,244, issued to Delval et al., discuss problems associated with the sensitivity of certain phosphate inhibitor systems to absorption of moisture. This can reduce the friction performance of brake materials after exposure to certain environments. The composition described in U.S. Pat. No. 5,759,622 may be vulnerable to moisture absorption. This invention provides a solution to this problem.

SUMMARY

In various embodiments, a method of inhibiting oxidation of a porous carbon-carbon composite is provided comprising the steps of: (a) contacting the carbon-carbon composite with an oxidation inhibiting composition comprising phosphoric acid or an acid phosphate salt, at least one aluminum salt and at least one additional metal salt, the oxidation inhibiting composition penetrating at least some of the pores of the carbon-carbon composite; and (b) heating the carbon-carbon composite at a temperature sufficient to form a deposit from the oxidation inhibiting composition within at least some of the penetrated pores of the carbon-carbon composite.

In various embodiments, an oxidation inhibiting composition is provided comprising: water, a nonaqueous polar liquid, or a mixture thereof; phosphoric acid or an acid phosphate salt; an aluminum salt; and at least one additional metal salt.

In various embodiments, a carbon-carbon composite treated by the foregoing method is provided. These include brakes and brake components. The brake components include brake lugs, and other exposed areas of braking systems. The braking systems include aircraft braking systems. The carbon-carbon composites treated in accordance with the inventive method, at least in one embodiment, exhibit improved resistance to oxidation, including catalyzed oxidation. The carbon-carbon composites treated in accordance with the inventive method at least in one embodiment, exhibit less sensitivity to reduction in friction as a result of moisture absorption from the atmosphere when compared to composites treated in accordance with prior art techniques.

DETAILED DESCRIPTION

Figure 1:
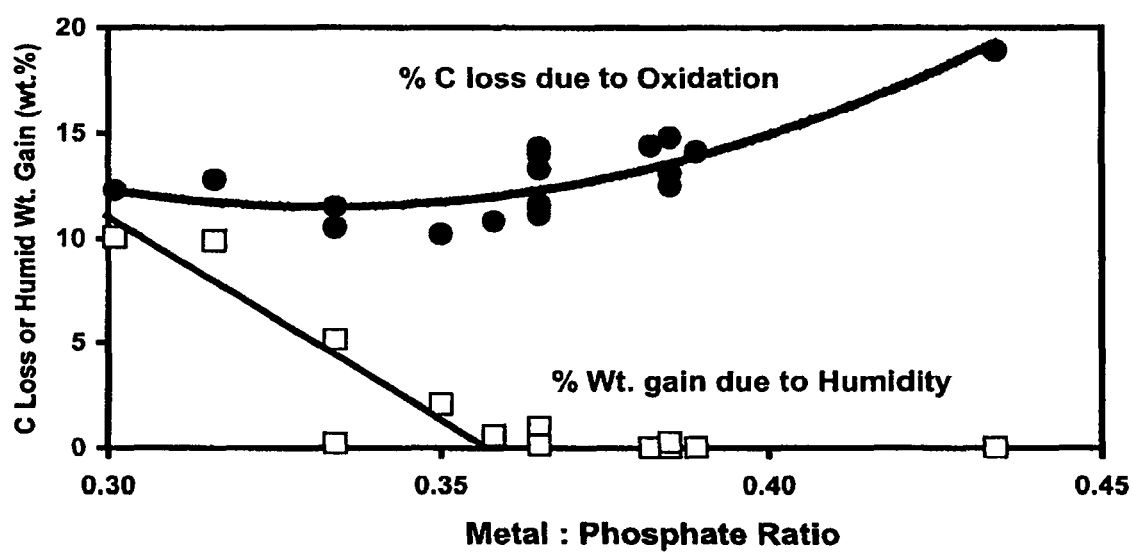
FIG. 1 is a plot of carbon loss and humidity weight gain versus metal to phosphate ratio obtained in Examples 19-36.

The term "retention" refers to reducing or preventing the migration of a material from inside the pores of a carbon-carbon composite out of the pores and onto a surface, for example, in response to heating or ambient humidity. The terms "impregnate," "penetrate," and their derivatives refer to a situation where materials infiltrate or flow into the pores of a porous material. The pores may be in the carbon-carbon composite, a barrier coating overlying the carbon-carbon composite, or a combination thereof.

The carbon-carbon composites that may be treated in accordance with the present invention may be any carbon-carbon composite. The carbon-carbon composites may be prepared from carbon preforms. Carbon preforms may be made of carbon fibers, which may be formed from pre-oxidized acrylonitrile resin. In one embodiment, these fibers can be layered together to form a shape, such as a friction brake. The shape is heated and infiltrated with a pyrolyzable carbon source, such as methane, to form the carbon-carbon composite. The carbon-carbon composite may have a bulk density in the range from about 1.5 g/cm$^3$ to about 2.0 g/cm$^3$.

In one embodiment, the carbon-carbon composites may contain catalytic materials in their pores that increase the rate of oxidation of such composites. These catalytic materials may not be present at manufacture. However in one embodiment, contaminating materials that may be present at manufacture may be passivated prior to use using the inventive method. Whether the contaminating materials are present during manufacture, or are introduced after manufacture, a list of these contaminating materials may include calcium, sodium, potassium, copper, iron, and vanadium. These contaminating materials may also include other metals or materials encountered during service (e.g., ozone) or organic material.

In one embodiment, a barrier coating may be applied to at least one surface of the carbon-carbon composite prior to or subsequent to treatment with the oxidation inhibiting composition pursuant to the inventive method. The barrier coating materials that may be used may be carbides or nitrides including boron nitride, silicon carbide, titanium carbide, boron carbide, silicon oxycarbide, silicon nitride, and mixtures of two or more thereof.

The barrier coating may be applied to the carbon-carbon composite using any known method, including chemical vapor deposition (CVD), painting, spraying, molten application, and the like. In one embodiment, the carbon-carbon composite may have a silicon carbide-based coating prepared by CVD. In one embodiment, the barrier coating may be painted (brushed or sprayed) onto a surface, such as ZYP COATING (grade SC), ZYP Coatings, Inc. (Oak Ridge, Tenn.). The paint may be baked to a temperature of about 650° C., either before or after the pores of the carbon-carbon composite are treated with the oxidation inhibiting composition pursuant to the inventive method. In one embodiment, the barrier coating may be formed by treating the carbon-carbon composite with molten silicon. The molten silicon is reactive and may form a silicon carbide barrier on the carbon-carbon composite surface. This type of barrier coating may be referred to as a reaction formed barrier coating.

In one embodiment, the barrier coating may be porous, and the pores may be continuous, interconnected, or otherwise open to define pathways leading from a barrier coating surface into the barrier coating body. The porosity may be in the range from about 8 volume percent to about 13 volume percent. The porosity can be measured by displacement in a liquid, such as ISOPAR-M, under vacuum.

To ensure, increase, and/or enhance porosity of a barrier coating, in preparation for treatment with an oxidation inhibiting composition in accordance with various embodiments, a subsequent heat treatment may be used, or a cooling period after deposition or application of the barrier coating. This thermal treatment can be used to micro-crack the barrier coating in a predetermined manner. The micro-cracks may act as pores that may receive the oxidation inhibiting composition.

In one embodiment, the barrier coating may have a thickness in the range from about 12.5 micrometers (about 0.0005 inch) to about 125 micrometers (0.005 inch), and in one embodiment from about 25 micrometers (about 0.001 inch) to about 76 micrometers (about 0.003 inch), and in one embodiment from about 25 micrometers (about 0.001 inch) to about 50 micrometers (about 0.002 inch). In one embodiment, the barrier coating may have a thickness in the range of up to about 12.5 micrometers. In one embodiment, the barrier coating may have a thickness greater than about 125 micrometers.

The inventive method is useful in treating porous carbon-carbon composites whether or not a barrier coating has been applied to the composite. These composites may contain catalytic materials in their pores as indicated above. In embodiments wherein the barrier coating has not been applied, the oxidation inhibiting composition penetrates the pores of the carbon-carbon composite. In embodiments wherein the barrier coating has been applied, the oxidation inhibiting composition penetrates the pores of the barrier coating. A barrier coating can be applied to the carbon-carbon composite subsequent to being treated with the oxidation inhibiting composition.

The inventive method comprises contacting or treating the carbon-carbon composite with the oxidation inhibiting composition, and then heating the composite at a temperature sufficient to form a deposit from the oxidation inhibiting composition in at least some, and in one embodiment most or all, of the pores of the carbon-carbon composite. The contacted or treated carbon-carbon composite may be heated to a first, lower temperature (for example, about 30 to about 200° C.) to bake or dry the oxidation inhibiting composition. This step can be used when the oxidation inhibiting composition contains a volatile liquid. This step may be used to fix the oxidation inhibiting composition at a particular predetermined depth in the pores. A second, higher temperature (for example, about 200 to about 1000° C.) may then be used to form a deposit from the oxidation inhibiting composition within the pores of the carbon-carbon composite. In one embodiment, the oxidation inhibiting composition may be applied to preselected regions of a carbon-carbon composite that may be otherwise susceptible to oxidation. For example, aircraft brakes may have the oxidation inhibiting composition applied to the brake stators and lugs only.

During application of the oxidation inhibiting composition, the oxidation inhibiting composition may be applied to the carbon-carbon composite by painting, dipping, spraying, CVD, or other application methods, selected with reference to application specific criteria. This criteria may include, viscosity, end-use, economic consideration, ingredients used, depth of penetration desired, and the like.

The oxidation inhibiting composition may be applied to the carbon-carbon composite at a coat weight in the range from about 10 mg/cm$^2$ to about 60 mg/cm$^2$, and in one embodiment from about 15 mg/cm$^2$ to about 50 mg/cm$^2$, and in one embodiment from about 20 mg/cm$^2$ to about 40 mg/cm$^2$, and in one embodiment from about 20 mg/cm$^2$ to about 30 mg/cm$^2$. In one embodiment, the oxidation inhibiting composition may be applied to the carbon-carbon composite at a coat weight of up to about 10 mg/cm$^2$. In one embodiment, the oxidation inhibiting composition may be applied to the carbon-carbon composite at a coat weight of at least about 60 mg/cm$^2$.

In one embodiment, the oxidation inhibiting composition may be applied to provide a solids treatment level, or dry film, in the range from about 2.5 mg/cm$^2$ to about 15 mg/cm$^2$; and in one embodiment from about 5 mg/cm2 to about 12.5 mg/cm$^2$, and in one embodiment from about 6 mg/cm$^2$ to about 10 mg/cm$^2$.

Treating the carbon-carbon composite with the oxidation inhibiting composition may cause the carbon-carbon composite to gain weight. A treated carbon-carbon composite may have a weight gain in the range of from about 0.5 to about 15 mg per square centimeter of area of the carbon-carbon composite that is treated (mg/cm$^2$).

The treatment level or amount of solids of the oxidation inhibiting composition that is applied may be selected to provide for filling of open pores in the carbon-carbon composite at a predetermined depth of penetration. The depth of penetration may be selected with reference to the depth suitable for complete oxidation protection, and may be further selected with reference to amount that may avoid excessive penetration onto a wearing surface of the brake. In one embodiment, the preselected depth may be in the range of from 2.5 millimeters (about 0.1 inch) to about 5 millimeters (about 0.2 inch), and in one embodiment, the preselected depth may be in a range of less than about 2.5 millimeters (about 0.1 inch). In one embodiment, the preselected depth may be greater than about 5 millimeters (about 0.2 inch). Differing factors may be controlled to achieve the desired depth of penetration. Among the factors that may be controlled are the viscosity of the oxidation inhibiting composition, the coat weight, the soak or contact time of the oxidation inhibiting composition to the carbon-carbon composite prior to drying, the drying temperature, the pore size and porosity of the carbon-carbon composite, the chemical structure of the wetting agent and/or surfactant and others.

In one embodiment, the deposits may be uniformly distributed in the pores, e.g. with less than about 1 millimeter of separation between deposits. The deposits may be disposed, lodged or formed at a depth sufficient to provide oxidation protection to the carbon-carbon composites. In one embodiment, the deposits may be disposed at a depth in a range from about 2 millimeters to about 10 millimeters.

The treated carbon-carbon composites may be dried and/or heated to remove liquid from the oxidation inhibiting composition in embodiments wherein the oxidation inhibiting composition contains liquid, for example, water, a nonaqueous polar liquid, or a mixture thereof. This drying or heating step is optional. This drying or heating step may be conducted at a temperature in the range of about 30° C. to about 200° C. Drying may be distinguished from dehydration in that water may be present both in a free state and in a bound state. Some oxidation inhibiting compositions may be aqueous solutions or slurries and may have free water as a carrier liquid. Some of the oxidation inhibiting composition ingredients may have water in a bound, hydrating form. Drying removes free water from an aqueous solution or slurry, while dehydrating removes hydrated water.

The treated carbon-carbon composite may be heated, that is dried or baked, at a temperature in the range from about 200° C. to about 1000° C., and in one embodiment about 600° C. to about 1000° C. In one embodiment, this heating step may be conducted at a temperature in the range of about 200° C. to about 900° C., and in one embodiment about 400° C. to about 850° C. The heating step may be performed in an inert environment, such as under a blanket of inert gas (e.g., nitrogen, argon, and the like). The heating step may be conducted for a period from about 0.5 hour up to about 8 hours. In one embodiment, the carbon-carbon composites may be subjected to multiple treatment cycles. For example, from about 2 to about 4 treatment cycles may be used. The drying time and temperature are among the factors that may be controlled to determine the depth of penetration of the oxidation inhibiting composition in the carbon-carbon composite pores.

In one embodiment, the carbon-carbon composite may be pretreated or warmed prior to application of the oxidation inhibiting composition to aid in the penetration of the oxidation inhibiting composition. The heat treatment may be for a period of about 2 hours at a temperature of about 760° C. The treated carbon-carbon composite may be dried or baked in a non-oxidizing, inert atmosphere, e.g., nitrogen ($N_2$), to optimize the retention of the oxidation inhibitors in the pores. This retention may be improved by heating the carbon-carbon composite to about 200° C. and maintaining the temperature for about 1 hour before heating the carbon-carbon composite to a temperature in the range described above at a rate that removes water without boiling, and provides temperature uniformity throughout the load of the carbon-carbon composite. In one embodiment, the maximum temperature may be held for a time sufficient to obtain temperature uniformity throughout the carbon-carbon composite.

The oxidation inhibiting composition may comprise: water, a nonaqueous polar liquid, or a mixture thereof; phosphoric acid or an acid phosphate salt; an aluminum salt; and at least one additional metal salt.

A solution of orthophosphoric acid may be used as a source for the phosphoric acid. The acid phosphate salt may be an ammonium phosphate. The acid phosphate salt may comprise ammonium dihydrogen phosphate or ammonium hydrogen phosphate. The phosphoric acid or acid phosphate salt may be present in the oxidation inhibiting composition at a concentration in the range from about 15 weight percent to about 70 weight percent, and in one embodiment from about 15 weight percent to about 35 weight percent, and in one embodiment about 20 to about 30 weight percent.

The aluminum salt may be an aluminum halide, aluminum nitrate, aluminum phosphate, aluminum sulfate, or a mixture of two or more thereof. A suitable aluminum halide may be aluminum chloride. In one embodiment, the aluminum salt may be an aluminum phosphate. A suitable aluminum phosphate may be mono-aluminum phosphate ($Al(H_2PO_4)_3$), which is sometimes referred to as MALP, and which is commonly available as an about 50 weight percent concentration solution. In one embodiment, this solution may be present in the oxidation inhibiting composition at a concentration of about 37 to about 52 weight percent. Suitable aluminum salts also include aluminum salts that form an aluminum phosphate in response to outside stimulus, such as heating. The aluminum salt may be present in the oxidation inhibiting composition at a concentration in the range from about 10 weight percent to about 50 weight percent, and in one embodiment from about 15 weight percent to about 30 weight percent.

The cation of the additional metal salt may be multivalent. The metal may be an alkaline earth metal or a transition metal. The multivalent cation may be derived from a non-metallic element such as boron. The term "metal" is used herein to include multivalent elements such as boron that are technically non-metallic. The metal of the additional metal salt may be an alkaline earth metal such as calcium, magnesium, strontium, barium, or a mixture of two or more thereof. The metal for the additional metal salt may be iron, manganese, tin, zinc, or a mixture of two or more thereof. The anion for the additional metal salt may be an inorganic anion such as a phosphate, halide, sulfate or nitrate, or an organic anion such as acetate. In one embodiment, the additional metal salt may be an alkaline earth metal salt such as an alkaline earth metal phosphate. In one embodiment, the additional metal salt may be a magnesium salt such as magnesium phosphate. In one embodiment, the additional metal salt may be an alkaline earth metal nitrate, an alkaline earth metal halide, an alkaline earth metal sulfate, an alkaline earth metal acetate, or a mixture of two or more thereof. In one embodiment, the additional metal salt may be magnesium nitrate, magnesium halide, magnesium sulfate, or a mixture of two or more thereof. In one embodiment, the additional metal salt may comprise: (i) magnesium phosphate; and (ii) a magnesium nitrate, magnesium halide, magnesium sulfate, or a mixture of two or more thereof.

The additional metal salt may be selected with reference to its compatibility with other ingredients in the oxidation inhibiting composition. Compatibility may include metal phosphates that do not precipitate, flocculate, agglomerate, react to form undesirable species, or settle out prior to application of the oxidation inhibiting composition to the carbon-carbon composite. The phosphates may be monobasic ($H_2PO_4^-$), dibasic ($HPO_4^{-2}$), or tribasic ($PO_4^{-3}$). The phosphates may be hydrated. Examples of alkaline earth metal phosphates that may be used include calcium hydrogen phosphate (calcium phosphate, dibasic), calcium phosphate tribasic octahydrate, magnesium hydrogen phosphate (magnesium phosphate, dibasic), magnesium phosphate tribasic octahydrate, strontium hydrogen phosphate (strontium phosphate, dibasic), strontium phosphate tribasic octahydrate and barium phosphate.

In one embodiment, a chemical equivalent of the additional metal salt may be used as the additional metal salt. Chemical equivalents include compounds that yield an equivalent (in this instance, an equivalent of the additional metal salt) in response to an outside stimulus such as, temperature, hydration, or dehydration. For example, equivalents of alkaline earth metal phosphates may include alkaline earth metal pyrophosphates, hypophosphates, hypophosphites and orthophosphites. Equivalent compounds include magnesium and barium pyrophosphate, magnesium and barium orthophosphate, magnesium and barium hypophosphate, magnesium and barium hypophosphite, and magnesium and barium orthophosphite.

While not wishing to be bound by theory, it is believed that the addition of multivalent cations, such as alkaline earth metals, transition metals and nonmetallic elements such as boron, to the oxidation inhibiting composition enhances the hydrolytic stability of the metal-phosphate network. In general, the hydrolytic stability of the metal-phosphate network increases as the metal content increases, however a change from one metallic element to another may influence oxidation inhibition to a greater extent than a variation in the metal-phosphate ratio. The solubility of the phosphate compounds may be influenced by the nature of the cation associated with the phosphate anion. For example, phosphates incorporating monovalent cations such as sodium orthophosphate or phosphoric acid (hydrogen cations) are very soluble in water while (tri)barium orthophosphate is insoluble. Phosphoric acids can be condensed to form networks but such compounds tend to remain hydrolytically unstable. Generally, it is believed that the multivalent cations link phosphate anions creating a phosphate network with reduced solubility. Another factor that may influence hydrolytic stability is the presence of —P—O—H groups in the condensed phosphate product formed from the oxidation inhibiting composition during thermal treatment. The oxidation inhibiting composition may be formulated to minimize concentration of these species and any subsequent hydrolytic instability. Whereas increasing the metal content may enhance the hydrolytic stability of an oxidation inhibiting composition, it may be desirable to strike a balance between composition stability and effectiveness as an oxidation inhibitor.

The additional metal salt may be present in the oxidation inhibiting composition at a concentration in the range from about 0.5 weight percent to about 30 weight percent, and in one embodiment from about 0.5 weight percent to about 25 weight percent, and in one embodiment from about 5 weight percent to about 20 weight percent. In one embodiment, a combination of two or more additional metal salts may be present at a concentration in the range from about 10 weight percent to about 30 weight percent, and in one embodiment from about 12 weight percent to about 20 weight percent.

In one embodiment, the oxidation inhibiting composition may include an aluminum salt and a metal phosphate composition wherein the metal phosphate composition includes an alkaline earth metal phosphate or its chemical equivalent.

In one embodiment, the oxidation inhibiting composition may include an aluminum phosphate and a metal phosphate composition, which may include an alkaline earth metal phosphate.

The relative amounts of (a) phosphoric acid and/or acid phosphate salt, (b) aluminum salt, and (c) the additional metal salt, may be expressed without taking into account the presence of water or other diluents. For example, the phosphoric acid or acid phosphate salt may be present in an amount of at least about 25 weight percent of the combined total weight of (a), (b) and (c). The phosphoric acid or acid phosphate salt may be present in an amount up to about 55 weight percent of the total of (a), (b) and (c). The aluminum salt may be present at a concentration of at least about 25 weight percent of the total of (a), (b) and (c). The aluminum salt may be present at a concentration up to about 55 weight percent of the total of (a), (b) and (c). The additional metal salt may be present in an amount of at least about 4 weight percent of the total of (a), (b) and (c). The additional metal salt may be present at a concentration up to about 40 weight percent of the total of (a), (b) and (c).

In one embodiment, the oxidation inhibiting composition may have a weight ratio of the additional metal to aluminum of about 0.5 to about 5, and in one embodiment from about 0.8 to about 3, and in one embodiment from about 1 to about 2.

In one embodiment, the oxidation inhibiting composition may have a metal to phosphate atomic ratio of about 0.26 to about 0.50, and in one embodiment, from about 0.32 to about 0.40, and in one embodiment from about 0.35 to about 0.37. In one embodiment, the ratio may be from about 0.40 to about 0.48.

The oxidation inhibiting composition may contain a relatively increased amount of the additional metal (e.g., alkaline earth metal, transition metal, boron) to adjust the metal to phosphorus ratio to be within the above-indicated range. In one embodiment, the oxidation inhibiting composition includes a metal halide such as magnesium chloride, which may be provided as magnesium chloride hexahydrate. In one embodiment, the oxidation inhibitor composition contains from about 5 to about 15 weight percent metal halide. In one embodiment, the oxidation inhibiting composition includes a metal nitrate such as magnesium nitrate, which may be provided as magnesium nitrate hexahydrate. In one embodiment, the oxidation inhibiting composition contains from about 10 to about 23 weight percent metal nitrate. In one embodiment, the amount of the additional metal may be increased by an amount in the range from about 5 weight percent to about 20 weight percent based on the weight of the oxidation inhibiting composition by adding the foregoing metal halide or metal nitrate to the oxidation inhibiting composition.

In one embodiment, the oxidation inhibiting composition may include an oxidizing agent such as nitric acid or a nitrate salt. The oxidation inhibiting composition may include nitric acid or a nitrate salt at a concentration in the range up to about 10 weight percent. While not wishing to be bound by theory, it is believed that the addition of an oxidizing agent such as nitric acid or a nitrate salt may enhance bonding of the oxidation inhibiting composition to the carbon-carbon composite substrate by inducing polarity at the interface of the carbon-carbon composite substrate and the oxidation inhibiting composition. Adhesion may also be enhanced by pretreatment of the carbon-carbon composite substrate to create, modify or add compatible functionalities.

The oxidation inhibiting composition may include boron. In one embodiment, the oxidation inhibiting composition includes boron at a concentration in the range of up to about 20 weight percent. In one embodiment, the oxidation inhibiting composition may include boric acid at a concentration in the range from about 2 weight percent to about 20 weight percent, and in one embodiment about 10 weight percent.

The oxidation inhibiting composition may contain water, a nonaqueous polar liquid, or a mixture of water and a nonaqueous polar liquid. In one embodiment, the oxidation inhibiting composition may be an aqueous composition. The oxidation inhibiting composition may be in the form of a solution, dispersion or slurry. The nonaqueous polar liquid may be an alcohol, an aldehyde, a ketone, etc. The alcohol may contain 1 to about 8 carbon atoms, and in one embodiment 1 to about 4 carbon atoms. The aldehyde may contain 2 to about 8 carbon atoms. The ketone may contain 3 to about 8 carbon atoms. In one embodiment, the oxidation inhibiting composition may contain up to about 60 weight percent of water, a nonaqueous polar liquid or mixture thereof, and in one embodiment from about 20 weight percent to about 60 weight percent. When nonaqueous polar liquids are used in conjunction with water, the concentration of polar liquid relative to water may be in the range of from about 0.1 weight percent to about 25 weight percent, and in one embodiment from about 1 weight percent to about 15 weight percent. In one embodiment, the concentration of nonaqueous polar liquid other than water that is used is less than about 10 weight percent of the total solvent present (water plus nonaqueous polar liquid), and in one embodiment less than about 1 weight percent.

In one embodiment, the oxidation inhibiting composition may include a wetting agent. The wetting agent may be a polyol, an alkoxylated monohydric alcohol, a silicone surfactant, or a mixture of two or more thereof.

When the wetting agent is a polyol, the polyol may contain two, three, or four hydroxyl groups. In one embodiment, the polyol is alkoxylated. In one embodiment, the polyol is an acetylenic polyol, which may be branched or linear. Suitable acetylenic polyols include dimethylhexynol, dimethyloctynediol, and tetramethyldecynediol. Acetylenic polyols may be available from Air Products & Chemicals, Inc. (Allentown, Pa.) under the tradename SURFYNOL, for example, SURFYNOL 104. The acetylenic polyol may be alkoxylated. These materials are generally prepared by treating an acetylenic polyol with an epoxide (e.g. $C_2$-$C_8$ epoxide) such as ethylene oxide, propylene oxide, butylene oxide, and the like. A suitable alkoxylated acetylenic polyol is SURFYNOL 440.

Another wetting agent that may be used is an alkoxylated monohydric alcohol. The alkoxylated monohydric alcohols are generally prepared by reacting a monohydric alcohol with an epoxide, such as those epoxides described above. In one embodiment, the alcohol contains from about 8 to about 24 carbon atoms and in one embodiment about 10 to about 18 carbon atoms. The alkoxylated monohydric alcohol may be an alkoxylated linear alcohol. An example of a useful alkoxylated alcohol is POLYTERGENT SL-62, which may be available from Olin Corporation (East Alton, Ill.).

In one embodiment, the wetting agent may be a silicone surfactant. The silicone surfactants include polysiloxanes, such as amino-functional, hydroxy-functional, acetoxy-functional, or alkoxy-functional polysiloxanes. Examples of silicone surfactants include polydimethylsiloxane, polydiethylsiloxane, polymethylethylsiloxane, polymethylphenylsiloxane, polydiphenylsiloxane, diphenylsilanediol, block copolymers of a polysiloxane and a polyoxyalkylene, and the like. Silicone surfactants that may be used include the ABIL-B 8800 series of polysiloxane polyether compositions, and the ABIL WAX series of dialkoxy dimethylpolysiloxanes, polysiloxane polyalkyl copolymers, and polysiloxane polyalkylene copolymers available from Goldschmidt Chemical Company, part of Degussa Corporation (Hopewell, Va.); Alkasil NE silicone polyalkoxylate block copolymers available from Rhone Poulenc or Rhodia Inc. (Cranbury, N.J.); silicone glycol copolymers from Dow Corning (Midland, Mich.); HARTOSOFT S5793 amino functional silicone emulsion available from Huntsman Corporation (Salt Lake City, Utah); and BYK-346 polydimethylsiloxane from BYK Chemie USA (Wallingford, Conn.).

The wetting agent may be present in the oxidation inhibiting composition at a concentration of up to about 5 weight percent, and in one embodiment from about 0.01 weight percent to about 5 weight percent, and in one embodiment from about 0.1 weight percent to about 3 weight percent. In one embodiment, the concentration may be in the range from about 0.3 weight percent to about 1 weight percent of the total weight of the oxidation inhibiting composition.

The oxidation inhibiting composition may be made by blending together phosphoric acid or the acid phosphate salt with water. The aluminum salt may then be added followed by the additional metal salt. The wetting agent, when used, may be added to the above mixture. In one embodiment, between each addition step, the components may be mixed ultrasonically or by stirring at ambient temperature and pressure.

In one embodiment, the oxidation inhibiting composition may be applied to non-wearing surfaces of a carbon-carbon composite that may be exposed to oxidation. These non-wearing surfaces may include the back face of the end plates of a brake stack, and drive areas, an inner diameter (ID) surface of a stator and a lug, and an outer diameter (OD) surface of a rotor in the brake stack.

In one embodiment, the oxidation inhibiting composition may provide protection to the carbon-carbon composite by reducing carbon loss due to oxidation. The inventive method may be used to provide an extended service life for carbon-carbon composites by preventing or reducing oxidation, and in particular, catalyst-accelerated internal oxidation.

The inventive method may be used to treat articles that may be useful in aircraft brakes. The brakes may operate at temperatures in the range from about 100° to about 700° C. during normal service. Where embodiments are used in conjunction with a barrier coating, operation temperatures may be in the range from about 100° C. to about 900° C. Commercial aircraft brakes operate most of the time at relatively lower temperatures, for example, temperatures in the range from about 400° C. to about 600° C., and such aircraft brakes treated in accordance with various embodiments may be operated in this range.

EXAMPLES

The following examples are intended only to illustrate methods and embodiments in accordance with the various embodiments, and as such should not be construed as imposing limitations upon the claims. Unless specified otherwise, all ingredients are commercially available, pressure is at ambient atmosphere, temperature is room temperature or expressed in ° C., amounts or concentrations are in parts by weight or percent by weight.

Example 1

(a) An aqueous mixture, 1(a), is prepared by mixing 48 parts of a 50 percent by weight concentration of an aqueous mixture of mono-aluminum phosphate (MALP), 29.5 parts of an 85 percent by weight concentration of a phosphoric acid aqueous solution, 10 parts of water, and 10 parts of magnesium phosphate tribasic octahydrate. Mixture 1(a) is stirred and warmed until clear.

(b) An aqueous mixture, 1(b), is prepared by mixing 48 parts of a 50 percent by weight concentration of an aqueous mixture of MALP, 29.5 parts of an 85 percent by weight concentration of a phosphoric acid aqueous solution, 10 parts of water, and 10 parts of magnesium phosphate tribasic octahydrate, and 0.5 parts of a polydimethylsiloxane which is commercially available from BYK Chemie USA (Wallingford, Conn.) as BYK 346. Mixture 1(b) is stirred and warmed until clear.

c) Mixtures 1(a) and 1(b) are painted onto a carbon-carbon composites. Pores near the painted surface are impregnated. The treated carbon-carbon composite is heated at a temperature of 676° C. under nitrogen for two hours.

Example 2 a) An aqueous mixture, 2(a), is prepared by mixing 48 parts of a 50 percent concentration of MALP, 29.5 parts of an 85 percent by weight concentration of a phosphoric acid aqueous solution, 10 parts of water, and 22 parts of a magnesium phosphate tribasic octahydrate. Mixture 2(a) is stirred and warmed until clear.

b) An aqueous mixture, 2(b), is prepared by mixing 48 parts of a 50 percent concentration of MALP, 29.5 parts of an 85 percent by weight concentration of a phosphoric acid aqueous solution, 10 parts of water, 22 parts of a magnesium phosphate tribasic octahydrate, and 0.5 parts of BYK 346. Mixture 2(b) is stirred and warmed until clear.

c) Mixtures 2(a) and 2(b) are painted onto a carbon-carbon composite. Pores near the painted surface are impregnated. The coated carbon-carbon composite is heated at a temperature of 676° C. under nitrogen for two hours.

Example 3 a) An aqueous mixture, 3(a), is prepared by mixing 48 parts of a 50 percent concentration of MALP, 29.5 parts of an 85 percent by weight concentration of a phosphoric acid aqueous solution, 10 parts of water, and 30 parts of a magnesium phosphate tribasic octahydrate. Mixture 3(a) is stirred and warmed until clear.

b) An aqueous mixture, 3(b), is prepared by mixing 48 parts of a 50 percent concentration of MALP, 29.5 parts of an 85 percent by weight concentration of a phosphoric acid aqueous solution, 10 parts of water, 30 parts of a magnesium phosphate tribasic octahydrate, and 0.5 parts of BYK 346. Mixture 3(b) is stirred and warmed until clear.

c) Mixtures 3(a) and 3(b) are painted onto a carbon-carbon composite. Pores near the painted surface are impregnated, and the carbon-carbon composite thus treated is heated at 676° C. under nitrogen for two hours.

Example 4

An aqueous mixture, 4, is prepared by mixing 48 parts MALP (50% concentration), 34 parts ammonium dihydrogen phosphate, 85 parts water, and 22 parts magnesium phosphate tribasic octahydrate. The aqueous mixture, 4, is stirred and warmed until clear. Mixture 4 is painted onto a carbon-carbon composite. Pores near the painted surface are impregnated. The coated carbon-carbon composite is heated at a temperature of 676° C. under nitrogen for two hours.

Example 5

An aqueous mixture, 5, is prepared by mixing 10.00 parts water, 29.50 parts orthophosphoric acid (85% concentration), 48.00 parts MALP (50% concentration), 33.20 parts tin tetrachloride pentahydrate and 0.50 parts of BYK-346. Mixture 5 is painted onto a carbon-carbon composite. Pores near the painted surface are impregnated. The coated carbon-carbon composite is heated at a temperature of 676° C. under nitrogen for two hours.

Example 6

An aqueous mixture, 6, is prepared by mixing 10.00 parts water, 29.50 parts orthophosphoric acid (85% concentration), 48.00 parts MALP (50% concentration), 37.70 parts ferric nitrate nonahydrate and 0.50 parts of BYK-346. Mixture 6 is painted onto a carbon-carbon composite. Pores near the painted surface are impregnated. The coated carbon-carbon composite is heated at a temperature of 676° C. under nitrogen for two hours.

The carbon-carbon composites treated in the foregoing Examples 1b, 2b, 3b and 4-6 are tested for carbon loss and weight gain due to humidity. The test procedures are described below. The results are summarized in the following Table 1.

TABLE 1

Oxidation Inhibiting Formulations, 1-6.

| Component | Example 1b | Example 2b | Example 3b | Example 4 | Example 5 | Example 6 |
|---|---|---|---|---|---|---|
| $H_2O$ | 10.00 | 10.00 | 10.00 | 85.00 | 10.00 | 10.00 |
| 85% $H_3PO_4$ | 29.50 | 29.50 | 29.50 | — | 29.50 | 29.50 |
| $(NH_4)H_2PO_4$ | — | — | — | 34.00 | — | — |
| MALP | 48.00 | 48.00 | 48.00 | 48.00 | 48.00 | 48.00 |
| $Mg_3(PO_4)_3 \cdot 8H_2O$ | 10.00 | 22.00 | 30.00 | 22.00 | — | — |
| $SnCl_4 \cdot 5H_2O$ | — | — | — | — | 33.20 | — |
| $Fe(NO_3)_3 \cdot 9H_2O$ | — | — | — | — | — | 37.70 |
| BYK-346 | 0.50 | 0.50 | 0.50 | — | 0.50 | 0.50 |
| % C loss @649° C. (30 h) | 2.9 | 5.3 | 7.7 | 3.0 | 3.5 | 4.0 |
| Metal: phosphate | 0.281 | 0.402 | 0.471 | 0.377 | 0.353 | 0.350 |
| % weight gain after humidity exposure (7 days) | 15.0 | 3.0 | <1.0 | 1.0 | 4.0 | 1.0 |

Example 7

An aqueous mixture, 7, is prepared by mixing 10.22 parts water, 30.18 parts orthophosphoric acid (85% concentration), 50.44 parts MALP (50% concentration), 8.66 parts magnesium phosphate octahydrate, 11.11 parts magnesium nitrate hexahydrate, and 0.50 parts BYK-346. Mixture 7 is coated onto a surface of a carbon-carbon composite sample. An optional drying step may be performed to control the penetration depth. The coated carbon-carbon composite is heated at a temperature of 788° C. under nitrogen for two hours.

Example 8

An aqueous mixture, 8, is prepared by mixing 10.22 parts water, 30.18 parts orthophosphoric acid (85% concentration), 50.44 parts MALP (50% concentration), 8.66 parts magnesium phosphate octahydrate, 11.11 parts magnesium chloride hexahydrate and 0.50 parts BYK-346. Mixture 8 is coated onto a surface of a carbon-carbon composite sample. An optional drying step may be performed to control the penetration depth. The coated carbon-carbon composite is heated at a temperature of 788° C. under nitrogen for two hours.

Example 9

An aqueous mixture, 9, is prepared by mixing 10.22 parts water, 30.18 parts orthophosphoric acid (85% concentration), 50.44 parts MALP (50% concentration), 8.66 parts magnesium phosphate octahydrate, 11.11 parts magnesium chloride hexahydrate, 7.80 parts concentrated nitric acid (70%) and 0.50 parts BYK-346. Mixture 9 is coated onto a surface of a carbon-carbon composite sample. An optional drying step may be performed to control the penetration depth. The coated carbon-carbon composite is heated at a temperature of 788° C. under nitrogen for two hours.

Example 10

An aqueous mixture, 10, is prepared by mixing 5.11 parts water, 30.18 parts orthophosphoric acid (85% concentration), 50.44 parts MALP (50% concentration), 8.66 parts magnesium phosphate octahydrate, 11.11 parts magnesium chloride hexahydrate, 5.85 parts concentrated nitric acid (70%) and 0.50 parts BYK-346. Mixture 10 is coated onto a surface of a carbon-carbon composite sample. An optional drying step may be performed to control the penetration depth. The coated carbon-carbon composite is heated at a temperature of 788° C. under nitrogen for two hours.

Example 11

An aqueous mixture, 11, is prepared by mixing 7.67 parts water, 24.14 parts orthophosphoric acid (85% concentration), 40.35 parts MALP (50% concentration), 10.39 parts magnesium phosphate octahydrate, 13.33 parts magnesium chloride hexahydrate, 5.85 parts concentrated nitric acid (70%) and 0.50 parts BYK-346. Mixture 11 is coated onto a surface of a carbon-carbon composite sample. An optional drying step may be performed to control the penetration depth. The coated carbon-carbon composite is heated at a temperature of 788° C. under nitrogen for two hours.

Example 12

An aqueous mixture, 12, is prepared by mixing 7.67 parts water, 36.22 parts orthophosphoric acid (85% concentration), 40.35 parts MALP (50% concentration), 6.93 parts magnesium phosphate octahydrate, 8.89 parts magnesium chloride hexahydrate, 5.85 parts concentrated nitric acid (70%) and 0.50 parts BYK-346. Mixture 12 is coated onto a surface of a carbon-carbon composite sample. An optional drying step may be performed to control the penetration depth. The coated carbon-carbon composite is heated at a temperature of 788° C. under nitrogen for two hours.

The carbon-carbon composites treated in the foregoing Examples 7-12 are tested for carbon loss and weight gain due to humidity using the test procedures described below. The results are summarized in the following Table 2.

TABLE 2

Oxidation Inhibiting Formulations, 7-12

| Component | Example 7 | Example 8 | Example 9 | Example 10 | Example 11 | Example 12 |
|---|---|---|---|---|---|---|
| $H_2O$ | 10.22 | 10.22 | 10.22 | 5.11 | 7.67 | 7.67 |
| 85% $H_3PO_4$ | 30.18 | 30.18 | 30.18 | 30.18 | 24.14 | 36.22 |
| MALP | 50.44 | 50.44 | 50.44 | 50.44 | 40.35 | 40.35 |

TABLE 2-continued

Oxidation Inhibiting Formulations, 7-12

| Component | Example 7 | Example 8 | Example 9 | Example 10 | Example 11 | Example 12 |
|---|---|---|---|---|---|---|
| $Mg_3(PO_4)_3 \cdot 8H_2O$ | 8.66 | 8.66 | 8.66 | 8.66 | 10.39 | 6.93 |
| $MgCl_2 \cdot 6H_2O$ | — | 11.11 | 11.11 | 11.11 | 13.33 | 8.89 |
| $Mg(NO_3)_2 \cdot 6H_2O$ | 11.11 | — | — | — | — | — |
| $HNO_3$ | — | — | 7.80 | 5.85 | 5.85 | 5.85 |
| BYK-346 | 0.50 | 0.50 | 0.50 | 0.50 | 0.50 | 0.50 |
| Metal: phosphate | 0.340 | 0.365 | 0.365 | 0.365 | 0.456 | 0.294 |
| % C loss @677° C. (*649° C.) (30 h) | *6.2 | *8.6 | 14.9 | 17.1 | 23.3 | 13.7 |
| % weight gain due to humidity (**10 days, 15 days) | **2.13 | **0.91 | 0.40 | 0.08 | 0.03 | 9.28 |

Example 13

An aqueous mixture, 13, is prepared by mixing 7.67 parts water, 36.22 parts orthophosphoric acid (85% concentration), 40.35 parts MALP (50% concentration), 10.39 parts magnesium phosphate octahydrate, 8.89 parts magnesium chloride hexahydrate, 5.85 parts concentrated nitric acid (70%) and 0.50 parts BYK-346. Mixture 13 is coated onto a surface of a carbon-carbon composite sample. An optional drying step may be performed to control the penetration depth. The coated carbon-carbon composite is heated at a temperature of 788° C. under nitrogen for two hours.

Example 14

An aqueous mixture, 14, is prepared by mixing 7.67 parts water, 24.14 parts orthophosphoric acid (85% concentration), 60.53 parts MALP (50% concentration), 6.93 parts magnesium phosphate octahydrate, 8.89 parts magnesium chloride hexahydrate, 5.85 parts concentrated nitric acid (70%) and 0.50 parts BYK-346. Mixture 14 is coated onto a surface of a carbon-carbon composite sample. An optional drying step may be performed to control the penetration depth. The coated carbon-carbon composite is heated at a temperature of 788° C. under nitrogen for two hours.

Example 15

An aqueous mixture, 15, is prepared by mixing 7.67 parts water, 24.14 parts orthophosphoric acid (85% concentration), 40.35 parts MALP (50% concentration), 6.93 parts magnesium phosphate octahydrate, 8.89 parts magnesium chloride hexahydrate, 5.85 parts concentrated nitric acid (70%) and 0.50 parts BYK-346. Mixture 15 is coated onto a surface of a carbon-carbon composite sample. An optional drying step may be performed to control the penetration depth. The coated carbon-carbon composite is heated at a temperature of 788° C. under nitrogen for two hours.

Example 16

An aqueous mixture, 16, is prepared by mixing 10.22 parts water, 30.18 parts orthophosphoric acid (85% concentration), 50.44 parts MALP (50% concentration), 8.66 parts magnesium phosphate octahydrate, 8.33 parts magnesium chloride hexahydrate, 1.86 parts zinc chloride, 7.80 parts concentrated nitric acid (70%) and 0.50 parts BYK-346. Mixture 16 is coated onto a surface of a carbon-carbon composite sample. An optional drying step may be performed to control the penetration depth. The coated carbon-carbon composite is heated at a temperature of 788° C. under nitrogen for two hours.

Example 17

An aqueous mixture, 17, is prepared by mixing 10.22 parts water, 30.18 parts orthophosphoric acid (85% concentration), 50.44 parts MALP (50% concentration), 8.66 parts magnesium phosphate octahydrate, 8.33 parts magnesium chloride hexahydrate, 2.70 parts manganese chloride tetrahydrate, 7.80 parts concentrated nitric acid (70%) and 0.50 parts BYK-346. Mixture 17 is coated onto a surface of a carbon-carbon composite sample. An optional drying step may be performed to control the penetration depth. The coated carbon-carbon composite is heated at a temperature of 788° C. under nitrogen for two hours.

Example 18

An aqueous mixture, 18, is prepared by mixing 10.22 parts water, 26.84 parts orthophosphoric acid (85% concentration), 50.44 parts MALP (50% concentration), 8.66 parts magnesium phosphate octahydrate, 11.11 parts magnesium chloride hexahydrate, 5.00 parts lanthanum chloride heptahydrate, 7.80 parts concentrated nitric acid (70%) and 0.50 parts BYK-346. Mixture 18 is coated onto a surface of a carbon-carbon composite sample. An optional drying step may be performed to control the penetration depth. The coated carbon-carbon composite is heated at a temperature of 788° C. under nitrogen for two hours.

Comparative Example C-1

The following example is provided for purposes of comparison. An aqueous mixture, C-1, is prepared by mixing 25.00 parts orthophosphoric acid (85% concentration) and 75.00 parts MALP (50% concentration). Mixture C-1 is coated onto a surface of a carbon-carbon composite sample. The coated carbon-carbon composite is heated at a temperature of 788° C. under nitrogen for two hours.

The carbon-carbon composites treated in the foregoing Examples 13-18 and C-1 are tested for carbon loss and weight gain due to humidity using the procedures described below. The results are summarized in the following Table 3.

TABLE 3

Oxidation Inhibiting Formulations, 13-18, and C-1.

| Component | Example 13 | Example 14 | Example 15 | Example 16 | Example 17 | Example 18 | Example C-1 |
|---|---|---|---|---|---|---|---|
| $H_2O$ | 7.67 | 7.67 | 7.67 | 10.22 | 10.22 | 10.22 | — |
| 85% $H_3PO_4$ | 36.22 | 24.14 | 24.14 | 30.18 | 30.18 | 26.84 | 25.00 |
| MALP | 40.35 | 60.53 | 40.35 | 50.44 | 50.44 | 50.44 | 75.00 |
| $Mg_3(PO_4)_3 \cdot 8H_2O$ | 10.39 | 6.93 | 6.93 | 8.66 | 8.66 | 8.66 | — |
| $MgCl_2 \cdot 6H_2O$ | 8.89 | 8.89 | 8.89 | 8.33 | 8.33 | 11.11 | — |
| $ZnCl_2$ | — | — | — | 1.86 | — | — | — |
| $MnCl_2 \cdot 4H_2O$ | — | — | — | — | 2.70 | — | — |
| $LaCl_3 \cdot 7H_2O$ | — | — | — | — | — | 5.00 | — |
| $HNO_3$ | 5.85 | 5.85 | 5.85 | 7.80 | 7.80 | 7.80 | — |
| BYK-346 | 0.50 | 0.50 | 0.50 | 0.50 | 0.50 | 0.50 | — |
| Metal: phosphate | 0.331 | 0.359 | 0.365 | 0.365 | 0.365 | 0.412 | 0.207 |
| % C loss @677° C. (30 h) | 13.8 | 15.9 | 14.8 | 18.2 | 18.3 | 15.7 | 19.3 |
| % weight gain due to humidity (15 days) | 1.68 | 0.15 | 0.14 | 0.40 | 0.39 | 0.06 | 1.61 |

The inventive oxidation inhibiting compositions provide improved oxidation protection, even against catalyzed oxidation. These compositions also exhibit good resistance to moisture sensitivity. Moisture sensitivity is shown when the oxidation inhibiting composition increases in weight by absorbing water.

To test moisture sensitivity, samples of the oxidation inhibiting composition are placed in carbonized graphite crucibles. The graphite crucible is heated at about 677° C. (about 1250° F.) in flowing nitrogen for two hours to remove water. The crucible is then placed in a humidity cabinet at 30° C. or 40° C. and at 95% relative humidity for 7, 10 or 15 days. The weight of each crucible is measured at least twice a day. The weight change of the solid inhibitor resulting from the absorption of water vapor is calculated with respect to time using the following FORMULA I:

% moisture pick up (or % MPU)=$((C_1-C_0)/(C_0-C_b))\times 100$ wherein $C_1$ is the current weight of the crucible after exposure, $C_0$ is the weight of the crucible and solid inhibitor before exposure and $C_b$ is the weight of the bare crucible before inhibitor. Table 1 contains the results for Examples 1(b), 2(b), 3(b), 5 and 6 at 30° C. The results for Examples 7-12 at 40° C. are shown in Table 2, and the results for Examples 13-18 and C-1 at 40° C. are shown in Table 3.

Crucibles are prepared as described above and baked at the temperature indicated below for two hours in flowing nitrogen. The moisture sensitivity results of these tests are shown in Table 4.

TABLE 4

Moisture sensitivity for Examples 1(b), 2(b), and 3(b).

| Example | Bake Temperature (° C.) | % weight moisture absorbed |
|---|---|---|
| Example 1 (b) | 649 | 18.0 |
| | 788 | 2.0 |
| Example 2 (b) | 649 | 3.5 |
| | 788 | 0.1 |
| Example 3 (b) | 649 | 0.5 |
| | 788 | 0.1 |

As can be seen, the baking temperature of 788° C. improves the resistance to moisture sensitivity.

To illustrate the oxidation inhibiting properties of various embodiments, coupons are prepared from a high-purity carbon-carbon composite commercially available from Goodrich Corporation. The coupons are one inch square with a quarter inch thickness. The density and amount of open porosity is measured by weighing the coupon while immersed in a wetting liquid, such as ISOPAR-M, that has been absorbed into the pores while under vacuum, and measuring the density of that liquid from the weight of a standard metal cylinder of known volume at about the same temperature (within about 0.5° C.) to calculate the volume of liquid displaced by the saturated coupon. The weight of the coupon in air after lightly blotting the surface after removal from the liquid can be measured to obtain the weight of liquid added to the pores, by subtracting the dried weight of the coupon. The weight of the saturated coupon can also be used to obtain the external volume displaced by the liquid, by subtracting the immersed weight and dividing by the density of the liquid. Alternatively, the external volume of the coupon can be calculated from measured dimensions of a uniform geometric body. The open porosity is related to the bulk density ("BD")=dry weight/external volume, and the apparent density of impervious carbon ("ID")=dry weight/volume of carbon, as % OP=$100\{1-(BD/ID)\}$.

The coupons are immersed for two minutes in oxidation inhibiting compositions and then blotted dry with a paper towel. The coupons are heated at 649° C., 677° C., or 788° C. in flowing nitrogen for two hours to remove water and form a deposit from the oxidation inhibiting composition. The oxidation tests are performed in air at a temperature of 649° C. for up to 30 hours. The coupons are placed on alumina rods and are inserted into a furnace in an air atmosphere flowing at approximately 6000 standard cubic centimeters per minute. The coupons are removed from the furnace and weighed after 1, 2, 4, 8, 24 and 30 hours. The % carbon weight loss is calculated by the following FORMULA II.

% carbon weight loss (or CWL)=$(W_0-W_1)/W_c)\times 100$ wherein $W_1$ is the current weight of the coupons after oxidation, $W_0$ is the weight of the coupon and inhibitor after bake out, and $W_c$ is the weight of the oxidation coupon before application of the inhibitor. Table 1 provides the results for Examples 1b, 2b, 3b and 4-6 at 649° C. for 30 hours. Table 2 provides the results for Examples 7 and 8 at 649° C. for 30 hours, and Examples 9-12 at 677° C. for 30 hours. Table 3 provides the results for Examples 13-18 and C-1 at 677° C. for 30 hours. Table 5 provides the following oxidation inhibiting results.

TABLE 5

Oxidation testing results for EXAMPLES 1(b), 2(b), and 3(b).

| Sample | Bake Temperature (° C.) | % carbon weight loss |
|---|---|---|
| Example 1 (b) | 649 | 2.3 |
| | 677 | 2.4 |
| | 788 | 2.9 |
| Example 2 (b) | 649 | 4.0 |
| | 677 | 4.0 |
| | 788 | 5.3 |
| Example 3 (b) | 649 | 7.0 |
| | 677 | 7.0 |
| | 788 | 7.7 |

As can be seen from Table 5, the oxidation inhibiting compositions provide oxidation protection. Also, oxidation for the samples baked at 649° C. is improved relative to those baked at 788° C.

Examples 19-36

Eighteen individual aqueous mixtures are prepared within the following ranges: 4.5 to 9.5 weight percent of water, 20.0 to 34.1 weight percent of orthophosphoric acid (85% concentration), 35.0 to 53.0 weight percent of MALP (50% concentration), 5.3 to 10.2 weight percent of magnesium phosphate octahydrate, 7.0 to 13.1 weight percent of magnesium chloride hexahydrate, and 0.35 to 0.55 weight percent of BYK-346. Each mixture is coated onto the surfaces of duplicate carbon-carbon composite samples and dried prior to thermal treatment. The coated samples are then baked at a temperature of 778° C. for two hours in a nitrogen atmosphere. Each sample is oxidized as described above and the percent weight loss due to oxidation is determined. Samples of each of the eighteen aqueous mixtures are placed in crucibles, the crucibles are placed in a humidity chamber as described above and the percent weight gain due to water absorption is computed. Each calculated value is plotted as a function of the metal-phosphate ratio which is shown in FIG. 1. The graphical representation of the data in FIG. 1 illustrates the relationship between the metal-phosphate ratio, oxidation inhibition and hydrolytic stability. The optimum metal-phosphate ratio for maximized oxidation inhibition and hydrolytic stability is about 0.36 for the formulations prepared according to Examples 19-36. The optimum metal-phosphate ratio can be metal-specific. The optimum ratio of 0.36 observed for the above-indicated magnesium-aluminum-phosphate-based oxidation inhibitor systems may not be the same with regard to hydrolytic stability for a zinc-aluminum-phosphate-based oxidation inhibitor system.

Example 37

An aqueous mixture, 37, is prepared as follows: 10.22 parts water, 30.18 parts orthophosphoric acid (85% concentration), 50.44 parts MALP (50% concentration), 8.21 parts zinc phosphate octahydrate, 7.45 parts zinc chloride, 5.85 parts concentrated nitric acid (70%) and 0.50 parts BYK-346 are mixed together. Mixture 37 is coated onto a surface of a carbon-carbon composite sample. The coated carbon-carbon composite is heated at a temperature of 788° C. under nitrogen for two hours. The calculated metal-phosphate ratio for this formulation is 0.36. The percent weight gain due to humidity exposure is 20% after 24 hours exposure to 95% relative humidity at 40° C.

Example 38

An aqueous mixture, 38, is prepared as follows: 10.00 parts water, 29.50 parts orthophosphoric acid (85% concentration), 48.00 parts MALP (50% concentration), 25.00 parts zinc phosphate octahydrate and 0.50 parts BYK-346 are mixed together. Mixture 38 is coated onto a surface of a carbon-carbon composite sample. The coated carbon-carbon composite is heated at a temperature of 676° C. under nitrogen for two hours. The calculated metal-phosphate ratio for this formulation is 0.44. The percent weight gain due to humidity exposure is 3% after 7 days exposure to 95% relative humidity at 30° C. The observed % carbon weight loss is about 2% after 30 hours at 649° C. This illustrates that the optimum metal-phosphate ratio can be specific to the metal selected as the additional metal in the oxidation inhibiting formulation.

While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A carbon-carbon composite treated by a method comprising:
   imparting hydrolytic stability to the carbon-carbon composite by contacting the carbon-carbon composite with an oxidation inhibiting composition comprising at least one of phosphoric acid and an acid phosphate salt, an aluminum salt, and an additional metal salt, the additional metal salt comprises at least one of a magnesium salt, zinc chloride, iron nitrate, and tin chloride, wherein the oxidation inhibiting composition has a metal to phosphate atomic ratio of 0.26 to 0.4, the oxidation inhibiting composition penetrating at least some of the pores of the carbon-carbon composite; and
   heating the carbon-carbon composite at a temperature sufficient to form a deposit from the oxidation inhibiting composition within at least some of the penetrated pores of the carbon-carbon composite.

2. The carbon-carbon composite of claim 1, wherein the weight ratio of the additional metal to aluminum is in the range of about 0.5 to 1 to about 5 to 1.

3. The carbon-carbon composite of claim 1, wherein the oxidation inhibiting composition further comprises at least one of water and a nonaqueous polar liquid.

4. The carbon-carbon composite of claim 1, wherein the additional metal salt comprises magnesium phosphate.

5. The carbon-carbon composite of claim 1, wherein the additional metal salt comprises at least one of magnesium nitrate, magnesium halide, and magnesium sulfate.

6. The carbon-carbon composite of claim 1, wherein the additional metal salt comprises magnesium phosphate and at least one of magnesium nitrate, magnesium halide, and magnesium sulfate.

7. The carbon-carbon composite of claim 1, wherein the aluminum salt comprises at least one of an aluminum halide, an aluminum nitrate, an aluminum phosphate, and aluminum sulfate.

8. The carbon-carbon composite of claim 1, wherein the oxidation inhibiting composition further comprises a wetting agent.

9. The carbon-carbon composite of claim 8, wherein the wetting agent comprises at least one of a polyol, an alkoxylated monohydric alcohol, a silicone surfactant, and a polysiloxane.

10. The carbon-carbon composite of claim 1, wherein the heating is performed in the range of about 200° C. to about 1000° C.

11. The carbon-carbon composite of claim 1 wherein a barrier coating is applied to a surface of the carbon-carbon composite at least one of prior to the imparting and subsequent to the heating.

12. The carbon-carbon composite of claim 11, wherein the barrier coating comprises at least one of a carbide and a nitride.

13. The carbon-carbon composite of claim 11, wherein the barrier coating comprises at least one of boron nitride, silicon carbide, titanium carbide, boron carbide, silicon oxycarbide, and silicon nitride.

14. The carbon-carbon composite of claim 11, wherein the barrier coating is applied to the carbon-carbon composite using chemical vapor deposition.

15. The carbon-carbon composite of claim 11, wherein the barrier coating is formed by reacting the carbon-carbon composite with molten silicon.

16. The carbon-carbon composite of claim 1, wherein the depth of penetration of the oxidation inhibiting composition into the pores of the carbon-carbon composite is in the range of about 2.5 to about 5 millimeters.

17. A brake component comprising a carbon-carbon composite treated by a method comprising:
    imparting hydrolytic stability to the carbon-carbon composite by contacting the carbon-carbon composite with an oxidation inhibiting composition comprising at least one of phosphoric acid and an acid phosphate salt, an aluminum salt, and an additional metal salt, the additional metal salt comprises at least one of a magnesium salt, zinc chloride, iron nitrate, and tin chloride, wherein the oxidation inhibiting composition has a metal to phosphate atomic ratio of 0.26 to 0.4, the oxidation inhibiting composition penetrating at least some of the pores of the carbon-carbon composite; and
    heating the carbon-carbon composite at a temperature sufficient to form a deposit from the oxidation inhibiting composition within at least some of the penetrated pores of the carbon-carbon composite.

18. The brake component of claim 17, wherein the depth of penetration of the oxidation inhibiting composition into the pores of the carbon-carbon composite is in the range of about 2.5 to about 5 millimeters.

19. The brake component of claim 17, wherein a barrier coating is applied to a surface of the carbon-carbon composite at least one of prior to the imparting and subsequent to the heating.

20. The brake component of claim 17, wherein the heating is performed in the range of about 200° C. to about 1000° C.

* * * * *